Oct. 30, 1934.  E. HAZELL  1,978,797
APPARATUS FOR THE MANUFACTURE OF RUBBER THREAD
Original Filed Nov. 18, 1932
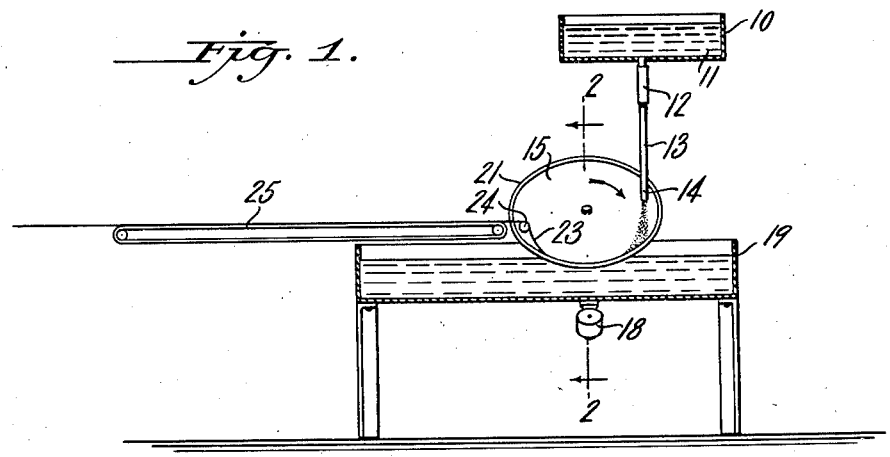
Fig. 1.
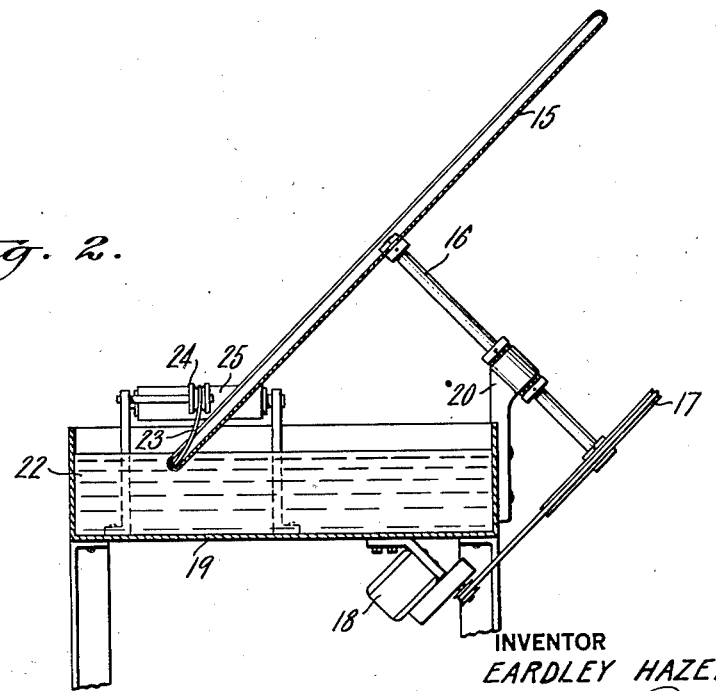
Fig. 2.
Fig. 3.
INVENTOR
EARDLEY HAZELL
BY
ATTORNEY Patented Oct. 30, 1934

1,978,797

UNITED STATES PATENT OFFICE 1,978,797

APPARATUS FOR THE MANUFACTURE OF RUBBER THREAD

Eardley Hazell, New York, N. Y., assignor to National India Rubber Company, Providence, R. I., a corporation of Rhode Island Application November 18, 1932, Serial No. 643,177
Renewed September 8, 1934

5 Claims. (Cl. 18—8)

This invention relates to the manufacture of rubber thread, and has for an object the continuous and rapid production of rubber thread in a simple and inexpensive manner from a suitable aqueous dispersion of rubber, such as rubber latex.

Other objects and advantages will appear from the following description, reference being made to the accompanying drawing illustrating a certain present preferred form of practicing the invention, in which:

Figure 1 is a side elevation more or less diagrammatically illustrating an apparatus and method embodying and carrying out the invention;

Figure 2 is a section through the line 2—2 of Fig. 1; and

Figure 3 is a detail view of the flanged edge of the disc of Figs. 1 and 2.

Referring to the drawing, the numeral 10 designates a reservoir for an aqueous dispersion of rubber 11, such as natural latex containing vulcanizing ingredients so that on subsequent drying and heating of rubber thread formed from it, the thread may become vulcanized. The latex is led from the reservoir through a hose connection 12 to a vertical feed pipe 13. The exit end 14 of the feed pipe 13 is situated adjacent the surface of a flat circular disc 15 mounted for rotation on shaft 16, the shaft being rotated by means of a pulley 17 driven from a motor 18. The shaft 16 is held in position above a tank 19 by means of a bracket 20 attached to the side of the tank and at such a height that the edge 21 of the disc which is flanged, preferably in the form of a U-shaped flange as shown in Figures 2 and 3, extends slightly below the surface of a coagulant 22 in the tank 19.

The exit end 14 of the feed pipe 13 is situated adjacent the rotary surface of the disc, preferably toward the circumference, as shown in Fig. 1, so that the rotation of the disc together with the gravity flow of the latex on the surface will provide a steady stream of latex only within the flanged edge of the disc at the point where the flange meets and extends below the surface of the coagulant 22 in the tank 19.

The latex 11 which is carried in a fine stream into the flange 21 is coagulated in the flange as the disc rotates, and a continuous length of coagulum 23 is drawn out of the submerged portion of the flange 21 and from the coagulant over a roller 24 onto a traveling belt 25, and then to the desired drying and vulcanizing chambers.

In operation, latex is fed from the reservoir 10 to the surface of rotating disc 15 through pipe 13, the exit end 14 of which is adjacent the surface of the rotating disc toward the circumference. The flow of latex through the pipe 13 may be regulated to give the optimum delivery to the surface of the disc by regulating the height of the reservoir, the column of latex feed, and the internal size of the hose connection 12 by a pinch-cock or other means. The speed of rotation of the disc may be regulated together with the latex feed to obtain the desired results. The latex flows down the surface of the rotating disc into the U-shaped flange at the edge of the same so that at the point where the flange extends below the surface of the coagulant the latex will be confined in the flange in a fine stream, and the coagulum formed is drawn out of the flange in the form of a continuous thread out of the coagulant at the desired speed over roller 24 by traveling belt 25, and carried to subsequent drying and vulcanizing operations by belt 25.

It is of course obvious that the viscosity of the latex, the rate of flow of the latex through the feed pipes, the number and position of the feed pipes, the depth to which the flanged edge of the disc extends below the surface of the coagulant, the composition of the latex with reference to the various compounding ingredients, and the rate of withdrawal of the coagulum, may be varied as desired. The latex may be vulcanized, or it may be unvulcanized, with or without vulcanizing ingredients added thereto. If a vulcanized thread is desired, it may be obtained by compounding the latex with suitable ingredients as described above and drying and vulcanizing the filamentary coagulum; or it may be formed from a vulcanized latex, in which case drying alone of the filamentary coagulum will produce a vulcanized thread; or a thread formed from unvulcanized latex without vulcanizing ingredients may be subjected to the action of vulcanizing liquids or vapors, or to solutions containing vulcanizing ingredients. The latex may be made heat sensitive by methods well known in the art and the latex streamed into a hot coagulant in the manner above described.

The term "latex" in the description and claims is used to designate broadly coagulable dispersions of elastic materials, including artificial dispersions of rubber or rubber-like materials as well as natural latex, which may be preserved or compounded or otherwise treated as desired and which may be in a normal, diluted, concentrated, or purified condition produced by methods well known in the art.

Various other modifications will be apparent to persons skilled in the art and it is understood that I do not intend to limit myself to the specific improvements as described above except as indicated in the appended claims.

Having thus described my invention, what I claim and desire to protect by Letters Patent is:—

1. In an apparatus for making rubber thread, a tank for containing a liquid coagulant for latex, a traveling flanged surface below the surface of coagulant in the tank, and means for supplying latex to the inside of the traveling flange.

2. In an apparatus for making rubber thread, a tank for containing a liquid coagulant for latex, a flanged disc rotating at an angle to the surface of coagulant in the tank and having its flange extending below said surface, and means for supplying latex to the inside of said flange.

3. In an apparatus for making rubber thread, a tank for containing a liquid coagulant for latex, a flat disc having a U-shaped flanged edge rotating at an angle to the surface of coagulant in the tank and having its flange extending below said surface of the coagulant, and means for supplying latex to the surface of the rotating disc whereby the latex will travel down the surface of the disc in the flange extending below the surface of the coagulant.

4. In an apparatus for making rubber thread, a tank for containing a liquid coagulant for latex, a traveling flanged surface below the surface of coagulant in the tank, means for supplying the latex to the inside of the traveling flange, and means for removing a continuous length of coagulum from said flange.

5. In an apparatus for making rubber thread, a tank for containing a liquid coagulant for latex, a flanged disc rotating at an angle to the surface of coagulant in the tank and having its flange extending below said surface, means for supplying latex to the inside of said flange, and means for removing a continuous length of coagulum from said flange and out of said tank.

EARDLEY HAZELL.